United States Patent Office
3,711,404
Patented Jan. 16, 1973

3,711,404
USE OF PHOSPHORAMIDATES OF CYCLIC
AMIDINES AS CORROSION INHIBITORS
Derek Redmore, Ballwin, Mo., assignor to
Petrolite Corporation, Wilmington, Del.
No Drawing. Original application Sept. 5, 1967, Ser. No.
665,288. Divided and this application Feb. 2, 1971,
Ser. No. 112,058
Int. Cl. C07d 49/34; C23f 11/16
U.S. Cl. 252—8.55 E   5 Claims

ABSTRACT OF THE DISCLOSURE

Amides of cyclic amidines and phosphoric acids including both oxygen, sulfur, and oxygen-sulfur-containing phosphoric acids, as illustrated by amides of the formula $$\left[\textcircled{A}\left[-A-\underset{H}{N}-\right]_p\right]_n \overset{X}{\underset{\|}{P}}(XR')_{3-n}$$

where Ⓐ is a cyclic amidine-containing radical, for example imidazoline and tetrahydropyridine, X is oxygen and/or sulfur; R' is hydrogen or an alcohol moiety; A is alkylene, $n$ is 1–3 and $p$ is 0–10. These compounds, among other uses are employed as corrosion inhibitors.

This application is a division of application Ser. No. 665,288, filed on Sept. 5, 1967, now U.S. Pat. No. 3,584,-008, patented on June 8, 1971.

This invention relates to amides of cyclic amidines and phosphoric acids. More particularly this invention relates to amides of the formula

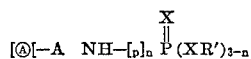

where Ⓐ is a cyclic amidine containing radical, for example imidazoline, and tetrahydropyrimidine; X is oxygen and/or sulfur; R' is hydrogen or an alcohol moiety; A is alkylene; $n$ is 1–3; and $p$ is 0–10. This invention also relates to uses for these amides, including their use as corrosion inhibitors.

More specifically, in the above formula Ⓐ contains either imidazoline or tetrahydropyrimidine radicals, for example, the following radicals (1)
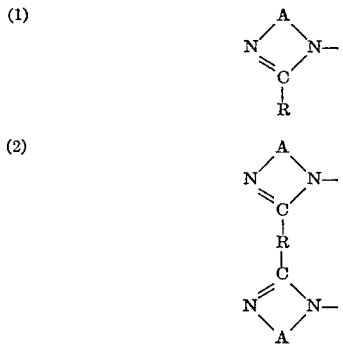

(2)

in which

and $$=C-R-C=$$

are the residual radicals derived from the carboxlic acids:

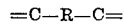

or

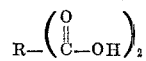

where R comprises, for example, a saturated or unsaturated aliphatic radical, a cycloaliphatic radical, an aryl radical, an aralkyl radical, an alkaryl radical, an alkoxyalkyl radical, an aryloxyalkyl radical, and the like; and A is an alkylene group; for example, ethylene and propylene radicals, such as $$-CH_2-CH_2-$$

$$-CH_2CH_2CH_2-$$

$$-CH_2-\underset{CH_3}{\overset{|}{CH}}-$$

$$-CH_2-\underset{CH_3}{\overset{|}{CH}}-CH_2-$$

$$-\underset{CH_3}{\overset{|}{CH}}-\underset{CH_3}{\overset{|}{CH}}-$$

In general the cyclic amidine phosphoramidates are prepared by reacting phosphorylating reagents such as phosphoric acids and thiophosphoric acids and derivatives of these such as anhydrides, partial anhydrides and halides, with the desired molar ratio of amino containing cyclic amidines for example of the formula

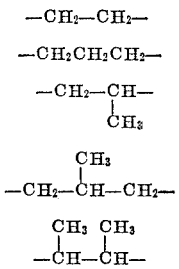

where $p$ is 0–10.

The products are characterized by having at least one P–N bond.

More specifically, the corrosion inhibiting aspect of this invention relates to a method for inhibiting corrosion of ferrous metals by hydrocarbon fluids containing water and corrosive materials such as $H_2S$, $CO_2$, inorganic acids, organic acids, etc., combinations of these materials with each other, combinations of each of said corrosive materials with oxygen, and combinations of said materials with each other and oxygen, which comprises adding to said fluids at least five parts per million of the above cyclic amidine phosphoramidates, said compounds being sufficiently soluble in the hydrocarbon fluid to inhibit corrosion.

THE CYCLIC AMIDINE PRECURSOR

The expression "cyclic amidines" is employed in its usual sense to indicate ring compounds in which there are present either 5 members or 6 members, and having 2 nitrogen atoms separated by a single carbon atom supplemented by either two additional carbon atoms or three additional carbon atoms completing the ring. All the carbon atoms may be substituted. The nitrogen atom of the ring involving two monovalent linkages (the 1-position) is substituted with an amino-containing group capable of reacting with the phosphate precursor to form the amides of this invention. This amino containing side group may be represented by $-(XNR')_nH$ wherein X is alkylene and R' is hydrogen or alkyl, but preferably hydrogen, and $n$ is a whole number, for example, 0–10 or higher, but preferably 0–3.

These cyclic amidines are further characterized as being imidazolines and tetrahydropyrimidines unsubstituted in 1-position or substituted in the 1-position with alkyleneamino or polyalkylene-amino groups in which the two-position carbon of the ring is generally bonded to a hydrocarbon radical or comparable radical derived from an acid, such as a low molal fatty acid, a high molal fatty acid, or comparable acids, polycarboxy acids, and the like.

For details of the preparation of imidazolines substituted in the 2-position from amines, see the following U.S. patents, U.S. No. 1,999,989, dated Apr. 30, 1935, Max Bockmuhl et al.; U.S. No. 2,155,877, dated Apr. 25, 1939, Edmund Waldmann et al.; and U.S. No. 2,155,878, dated Apr. 25, 1939, Edmund Waldmann et al. Also see Chem. Rev. 32, 47 (1943), and Chem. Rev. 54, 593 (1954).

Equally suitable for use in preparing compounds of my invention and for the preparation of tetrahydropyrimidines substituted in the 2-position are the polyamines containing at least one primary amino group and at least one secondary amino group, or another primary amino group separated from the first primary amino group by three carbon atoms instead of being separated by only two carbons as with imidazolines. This reaction as in the case of the imidazolines is generally carried out by heating the reactants to a temperature at which two moles of water are evolved for each carboxylic group and ring closure is effected. For details of the preparation of tetrahydropyrimidines, see German Pat. No. 700,371, dated Dec. 18, 1940, to Edmund Waldmann and August Chwala; German Pat. No. 701,322, dated Jan. 14, 1941, to Karl Kiescher, Ernst Erech and Willi Klarer, and U.S. Pat. No. 2,194,419, dated Mar. 19, 1940, to August Chwala.

Substituted imidazolines and tetrahydropyrimidines are obtained from a variety of acids beginning with the one-carbon acid (formic) through and including higher fatty acids or the equivalent having for example 32 carbon atoms. Modified fatty acids also can be employed as, for example, phenyl stearic acid or the like. Cyclic acids may be employed, including naphthenic acids. A variety of other acids including benzoic acid, substituted benzoic acid, salicylic acid, and the like, have been employed to furnish the residue

from the acid RCOOH in which the C of the residue

is part of the ring. The fatty acids employed, for example, may be saturated or unsaturated. Branched long chain fatty acids may be employed. See J. Am. Chem. Soc. 74, 2523 (1952). This applies also to the lower molecular weight acids as well.

Among sources of such acids may be mentioned straight chain and branched chain, saturated and unsaturated, aliphatic, cycloaliphatic, aromatic, hydroaromatic, aralkyl acids, etc.

Examples of saturated aliphatic monocarboxylic acids comprise: acetic, propionic, butyric, valeric, caproic, heptanoic, caprylic, nonanoic, capric, undecanoic, lauric, tridecanoic, myristic, pentadecanoic, palmitic, heptadecanoic, stearic, nonadecanoic, eicosanoic, heneicosanoic, docosanoic, tricosanoic, tetracosanoic, pentacosanoic, cerotic, heptacosanoic, montanic, nonacosanoic, melissic and the like.

Examples of ethylenic unsaturated aliphatic acids comprise: angelic, tiglic, the pentenoic acids, the hexenoic acids, for example, hydrosorbic acid, the heptenoic acids, the octenoic acids, the nonenoic acids, the decenoic acids, for example, obtusilic acid, the undecanoic acids, the dodecenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petroselinic acid, oleic acid, elaidic acid, the nonadecenoic acids, for example, the eicosenoic acids, the docosenoic acids, for example, erucic acid, brassidic acid, cetoleic acid, the tetracosenic acids, and the like.

Examples of dienoic acids comprise the pentadienoic acids, the hexadienoic acids, for example, sorbic acid, the octadienoic acids, for example, linoleic, and the like.

Examples of the trienoic acids comprise the octadecatrienoic acids, for example, linolenic acid, eleostearic acid, pseudo-eleostearic acid, and the like.

Examples of the cyclic aliphatic carboxylic acids comprise those found in petroleum called naphthenic acids, hydrocarpic and chaulmoogric acids, bicyclopentane carboxylic acids, cyclohexanecarboxylic acid, campholic acid, fencholic acids, and the like.

Examples of aromatic monocarboxylic acids comprise benzoic acid, substituted benzoic acids, for example, the toluic acids, the xyleneoic acids, alkoxy benzoic acid, phenyl benzoic acid, naphthalene carboxylic acid, and the like.

Mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; aralkyl and aromatic acids, such as Twitchell fatty acids, naphthoic acid, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids comprise those of the aliphatic series, for example, oxalic, malonic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids comprise mesocenic, citraconic, glutonic, itaconic, muconic, acenitic acids, and the like.

Examples of the aromatic polycarboxylic acids comprise isophthalic acids, terephthalic acids, substituted derivatives thereof, (e.g. alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups comprise hemimellitic, trimellitic, trimesic, mellophanic, prehnitic, pyromelitic acids, mellitic acid, and the like.

Other polycarboxylic acids comprise the dimeric, trimeric and poly acids, for example, diricinoleic acids, triricinoleic acid, polyricinoleic acid, and the like. Other polycarboxylic acids comprise those containing ether groups, for example, diglycollic acid. Mixtures of the above acids can be advantageously employed.

In addition, acid precursors such as esters, acid chlorides, glycerides, etc. can be employed in place of the free acid.

Thus, cyclic amidines within the scope of this invention include compounds of the formulae:

(1)

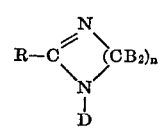

(2)

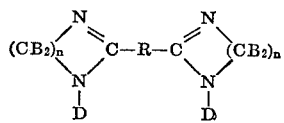

where

and =C—R—C= are the residues derived from the carboxylic acid, where R is a hydrocarbon radical having, for example, 1–30 carbon atoms, but preferably 9 to 20 carbons, and hydrocarbons in which the carbon atom chain is interrupted by oxygen, etc., $n$ is 2 or 3; and B is a hydrogen or a hydrocarbon radical, for example, an alkyl radical; and D is H or an aminoalkylene radical, for example $(XNR')_nH$ wherein X is alkylene and R' is hydrogen or alkyl and $n$ is a whole number, for example, 1–10, but preferably 1–3, and $(CB_2)_n$ is, for example, a divalent radical of the formula:

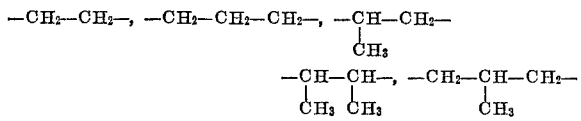

etc.

The following tables present examples of amino cyclic amidines which can be employed in the present invention. No particular advantage has been found in using other polyamines in which some other divalent radical, such as

appears. For this reason examples in Table I are limited to derivatives of the three most readily available polyamines above indicated.

TABLE 1

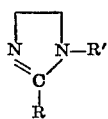

| Ex. | RCOOH source of RC | R' |
|---|---|---|
| 1a | Formic | CH₂CH₂NH₂ |
| 2a | Propionic | CH₂CH₂NH₂ |
| 3a | Isovaleric | CH₂CH₂NH₂ |
| 4a | Stearic | CH₂CH₂NH₂ |
| 5a | Melissic | CH₂CH₂NH₂ |
| 6a | Phenyl stearic | CH₂CH₂NH₂ |
| 7a | Salicylic | CH₂CH₂NH₂ |
| 8a | Cresotinic | CH₂CH₂NH₂ |
| 9a | Naphthenic | CH₂CH₂NH₂ |
| 10a | Oleic | CH₂CH₂NH₂ |
| 11a | Acetic | CH₂CH₂NHCH₂CH₂NH₂ |
| 12a | Pelargonic | CH₂CH₂NHCH₂CH₂NH₂ |
| 13a | Lauric | CH₂CH₂NHCH₂CH₂NH₂ |
| 14a | Palmitic | CH₂CH₂NHCH₂CH₂NH₂ |
| 15a | Cerotic | CH₂CH₂NHCH₂CH₂NH₂ |
| 16a | p-tert-Butyl benzoic | CH₂CH₂NHCH₂CH₂NH₂ |
| 17a | p-Hydroxybenzoic | CH₂CH₂NHCH₂CH₂NH₂ |
| 18a | Salicylic | CH₂CH₂NHCH₂CH₂NH₂ |
| 19a | Hydroxy naphthenic | CH₂CH₂NHCH₂CH₂NH₂ |
| 20a | Benzoic | CH₂CH₂NHCH₂CH₂NH₂ |
| 21a | Formic | CH₂CH₂NHCH₂CH₂NHCH₂CH₂NH₂ |
| 22a | Methyloctadecanoic | CH₂CH₂NHCH₂CH₂NHCH₂CH₂NH₂ |
| 23a | Capric | CH₂CH₂NHCH₂CH₂NHCH₂CH₂NH₂ |
| 24a | Stearic | CH₂CH₂NHCH₂CH₂NHCH₂CH₂NH₂ |
| 25a | Phenylstearic | CH₂CH₂NHCH₂CH₂NHCH₂CH₂NH₂ |
| 26a | Cresotinic | CH₂CH₂NHCH₂CH₂NHCH₂CH₂NH₂ |
| 27a | Linoleic | CH₂CH₂NHCH₂CH₂NHCH₂CH₂NH₂ |
| 28a | Salicylic | CH₂CH₂NHCH₂CH₂NHCH₂CH₂NH₂ |
| 29a | 2-hydroxy-3-methoxy-benzoic | CH₂CH₂NHCH₂CH₂NHCH₂CH₂NH₂ |
| 30a | Naphthenic | CH₂CH₂NHCH₂CH₂NHCH₂CH₂NH₂ |

The only polyamine available on a large scale for the manufacture of tetrahydropyrimidines is 3,3'-iminobispropylamine. This product can be converted into the tetramine or pentamine by appropriate reaction with a suitable imine or by reaction with acrylonitrile, followed by the usual steps of converting the intermediate into the amine. Tetrahydropyrimidines comparable to the substituted amidines in Table 1, appear in Table 2 immediately following.

TABLE 2

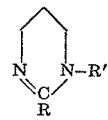

| Ex. | RCOOH source of RC | R' |
|---|---|---|
| 1b | Formic | CH₂CH₂CH₂NH₂ |
| 2b | Acetic | CH₂CH₂CH₂NH₂ |
| 3b | Butyric | CH₂CH₂CH₂NH₂ |
| 4b | Valeric | CH₂CH₂CH₂NH₂ |
| 5b | Isovaleric | CH₂CH₂CH₂NH₂ |
| 6b | Trimethyl acetic | CH₂CH₂CH₂NH₂ |
| 7b | Pelargonic | CH₂CH₂CH₂NH₂ |
| 8b | Lauric | CH₂CH₂CH₂NH₂ |
| 9b | Stearic | CH₂CH₂CH₂NH₂ |
| 10b | Arachidic | CH₂CH₂CH₂NH₂ |
| 11b | Eicosane-carboxylic | CH₂CH₂CH₂NH₂ |
| 12b | Cerotic | CH₂CH₂CH₂NH₂ |
| 13b | Melissic | CH₂CH₂CH₂NH₂ |
| 14b | Phenylstearic | CH₂CH₂CH₂NH₂ |
| 15b | Benzoic | CH₂CH₂CH₂NH₂ |
| 16b | Salicylic | CH₂CH₂CH₂NH₂ |
| 17b | Cresotinic | CH₂CH₂CH₂NH₂ |
| 18b | p-Hydroxybenzoic | CH₂CH₂CH₂NH₂ |
| 19b | p-tert-Butyl benzoic | CH₂CH₂CH₂NH₂ |
| 20b | 2-hydroxy-3-methoxy benzoic | CH₂CH₂CH₂NH₂ |
| 21b | Oleic | CH₂CH₂CH₂NH₂ |
| 22b | Undecylenic | CH₂CH₂CH₂NH₂ |
| 23b | Linoleic | CH₂CH₂CH₂NH₂ |
| 24b | Hydroxybutyric | CH₂CH₂CH₂NH₂ |
| 25b | Methyloctadecanoic | CH₂CH₂CH₂NH₂ |

Suitable products derived from the three amines previously noted are described in Table 3, following:

TABLE 3

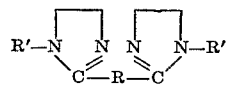

| Ex. No. | HOOC—R—COOH source of —CRC— | R' |
|---|---|---|
| 1c | Dilinoleic | CH₂CH₂NH₂ |
| 2c | Adipic | CH₂CH₂NH₂ |
| 3c | Suberic | CH₂CH₂NH₂ |
| 4c | Sebacic | CH₂CH₂NH₂ |
| 5c | Nonodecane dicarboxylic | CH₂CH₂NH₂ |
| 6c | Diglycolic | CH₂CH₂NH₂ |
| 7c | Ethylene bis(glycolic) | CH₂CH₂NH₂ |
| 8c | Methylene disalicylic | CH₂CH₂NH₂ |
| 9c | Stearyl Malonic | CH₂CH₂NH₂ |
| 10c | Phthalic | CH₂CH₂NH₂ |
| 11c | Succinic | CH₂CH₂NHCH₂CH₂NH₂ |
| 12c | Glutaric | CH₂CH₂NHCH₂CH₂NH₂ |
| 13c | Pimelic | CH₂CH₂NHCH₂CH₂NH₂ |
| 14c | Azelaic | CH₂CH₂NHCH₂CH₂NH₂ |
| 15c | Eicosane dicarboxylic | CH₂CH₂NHCH₂CH₂NH₂ |
| 16c | Dilinoleic | CH₂CH₂NHCH₂CH₂NH₂ |
| 17c | Isophthalic | CH₂CH₂NHCH₂CH₂NH₂ |
| 18c | Diglycolic | CH₂CH₂NHCH₂CH₂NH₂ |
| 19c | Lauryl malonic | CH₂CH₂NHCH₂CH₂NH₂ |
| 20c | Methylene disalicylic | CH₂CH₂NHCH₂CH₂NH₂ |
| 21c | Dilinoleic | CH₂CH₂NHCH₂CH₂NHCH₂CH₂NH₂ |
| 22c | Succinic | CH₂CH₂NHCH₂CH₂NHCH₂CH₂NH₂ |
| 23c | Suberic | CH₂CH₂NHCH₂CH₂NHCH₂CH₂NH₂ |
| 24c | Pimelic | CH₂CH₂NHCH₂CH₂NHCH₂CH₂NH₂ |
| 25c | Nonodecane dicarboxylic | CH₂CH₂NHCH₂CH₃CH₂NH₂ |
| 26c | Diglycolic | CH₂CH₂NHCH₂CH₂NHCH₂CH₂NH₂ |
| 27c | Methylene disalicylic | CH₂CH₂NHCH₂CH₂NHCH₂CH₂NH₂ |
| 28c | Stearyl malonic | CH₂CH₂NHCH₂CH₂NHCH₂CH₂NH₂ |
| 29c | Stearyl succinic | CH₂CH₂NHCH₂CH₂NHCH₂CH₂NH₂ |
| 30c | Terephthalic | CH₂CH₂NHCH₂CH₂NHCH₂CH₂NH₂ |

In the use of dicarboxy acids, the bulk of the examples were obtained from 3,3'-iminobispropylamine. These compounds are comparable to those which appeared in Table 3, preceding.

TABLE 4

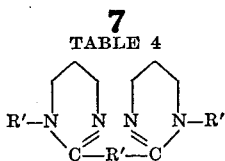

| Ex. No. | HOOC—R—COOH source of —CRC— | R' |
|---|---|---|
| 1d | Maleic | CH₂CH₂CH₂NH₂ |
| 2d | Succinic | CH₂CH₂CH₂NH₂ |
| 3d | Glutaric | CH₂CH₂CH₂NH₂ |
| 4d | Adipic | CH₂CH₂CH₂NH₂ |
| 5d | Suberic | CH₂CH₂CH₂NH₂ |
| 6d | Sebacic | CH₂CH₂CH₂NH₂ |
| 7d | Pimelic | CH₂CH₂CH₂NH₂ |
| 8d | Azelaic | CH₂CH₂CH₂NH₂ |
| 9d | Nonodecane dicarboxylic | CH₂CH₂CH₂NH₂ |
| 10d | Eicosane dicarboxylic | CH₂CH₂CH₂NH₂ |
| 11d | Diglycolic | CH₂CH₂CH₂NH₂ |
| 12d | Ethylene bisglycolic | CH₂CH₂CH₂NH₂ |
| 13d | Methylene disalicylic | CH₂CH₂CH₂NH₂ |
| 14d | Dilinoleic | CH₂CH₂CH₂NH₂ |
| 15d | Stearyl malonic | CH₂CH₂CH₂NH₂ |
| 16d | Lauryl succinic | CH₂CH₂CH₂NH₂ |
| 17d | Isotetradecyl succinic | CH₂CH₂CH₂NH₂ |
| 18d | Phthalic | CH₂CH₂CH₂NH₂ |
| 19d | Isophthalic | CH₂CH₂CH₂NH₂ |
| 20d | Terephthalic | CH₂CH₂CH₂NH₂ |
| 21d | Glutaconic | CH₂CH₂CH₂NH₂ |

THE PHOSPHORIC ACID MOIETY

The desired products are obtained by reacting an amino-containing cyclic amidine with a phosphorylating reagent which is a derivative of phosphoric acid. The reaction products can be described by the formula:

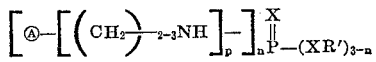

where
X=S and/or O
n=1–3
p=0–10
Ⓐ is a cyclic amidine
R' is H, alkyl (e.g. methyl, ethyl, propyl, hexyl, 2-ethyl hexyl, lauryl, etc.), cycloalkyl (e.g. cyclopentyl, cyclohexyl), aryl (phenyl, tolyl, anisyl) or heterocyclic (furfuryl, etc.).

The simplest phosphorylating reagent which can be used is ortho-phosphoric acid, but this requires vigorous conditions to bring about reaction leading to side reaction. The products from this reagent are mixtures containing some monophosphoramidates, $$A-[(CH_2)_{2-3}NH]_p-\overset{O}{\underset{\|}{P}}(OH)_2$$

Reagents which are generally preferred as phosphorylating reagents are anhydrides, partial anhydrides and halides (including phosphoryl and thiophosphoryl trihalides, dialkyl or arylphosphorohalidates,

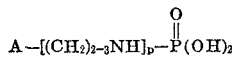

and alkyl or aryl phosphorodihalidates,

of phosphoric acid. These reagents require much milder conditions than ortho phosphoric acid itself since they are highly reactive and furthermore give much better yields of the required products by elimination of side reactions. The exact reagent of choice will depend on the individual amino-containing amidine to be reacted and on the structure of the desired product. For example phosphorus pentoxide is a powerful phosphorylating reagent which on reaction with an amino-containing amidine yields a mixture of phosphoramides

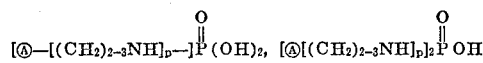

It is often preferred to react the phosphorus pentoxide partially with the amino-containing amidine and then with a hydroxy compound such as a simple alcohol (e.g. ethanol, propanol). In this case a mixture containing phosphoramidate ester is obtained containing the following structures:

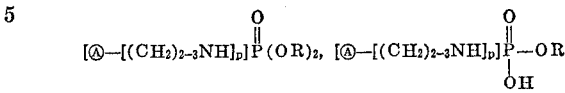

Phosphorus pentasulfide is similarly a powerful phosphorylating reagent which with amino-containing amidines gives similar products to those obtained from phosphorus pentoxide in which some or all of the oxygens attached to phosphorus are replaced by sulfur.

Polyphosphoric acid is a reagent which is intermediate in phosphorylating power between ortho phosphoric acid and phosphorus pentoxide (it is in fact a partial anhydride). This reagent can be reacted alone with amino-containing cyclic-amidines or in combination with hydroxy compounds to give products similar to those described for the phosphorus pentoxide.

Another important group of phosphorylating reagents which are used to prepare the products of this invention are halides of phosphoric acid. Among these are phosphoryl halide, POX₃ (where X=Br, Cl), phosphorochloridates,

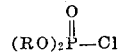

(where R is alkyl, cycloalkyl, aryl, heterocyclic), phosphorodichloridates

(where R is as defined above). For example, a phosphorochloridate can be reacted with an amino-containing cyclic amidine to give a phosphoramidate as follows:

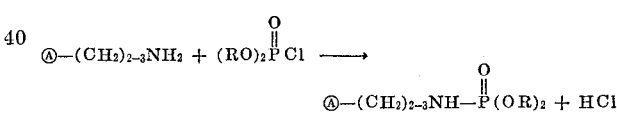

A phosphorodichloridate would give a similar reaction:

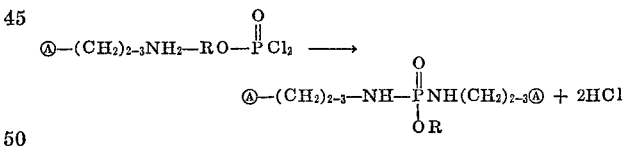

The hydrogen chloride produced in these reactions is normally taken up by the amidine ring as the reaction proceeds. However, in some cases it may be desirable to add a base to remove the acid as it is formed. For example, a tertiary amine such as pyridine may be used or an alkali metal oxide or carbonate such as calcium oxide or carbonate.

Other methods of phosphorylation are known and can be found described in "Structure and Mechanism in Organo-Phosphorus Chemistry," p. 250–288 by R. F. Hudson, Academic Press, 1965, and also in "Newer Methods of Preparative Organic Chemistry," vol. III, Ed. W. Foerst, p. 319–356, Academic Press, 1964.

The following examples are presented for purposes of illustration and not of limitation.

EXAMPLE 1

Diethylene triamine (101 g.; 1 mole) was mixed with Crofatol P (a mixture of C₁₈ fatty acids) (290 g.; 1 equivalent) and heated to 160° for one hour in a flask fitted with still head and condenser for distillation. The pressure in the flask was gradually reduced to 40 m. and the water produced in the reaction gradually distilled off and was collected. Heating was continued at 170–185° for a further 2½ hours at which time the reaction was complete. The product was mainly at 1-β-amino ethyl 2-imidazoline represented in the following formula

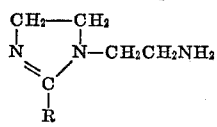

R is Crofatol P residue.

EXAMPLE 2

To a stirred suspension of phosphorus pentoxide (52 g.; 0.4 mole) in toluene (130 ml.) was added the aminoethyl imidazoline of Example 1 (75 g.; 0.2 mole) dissolved in toluene (45 ml.) dropwise during 40 minutes. The mixture was then heated at 100–110° for 1¼ hours during which time most of the solid phosphorus pentoxide disappeared. After cooling to 40° 2-ethyl hexanol (130 g.; 1 mole) was added over a period of 1¼ hours. During the addition the temperature rose to 60°. The reaction was completed by heating at 110–120° for three hours. The product is a mixture of phosphoramides, the main constituents of which can be represented by the formulae:

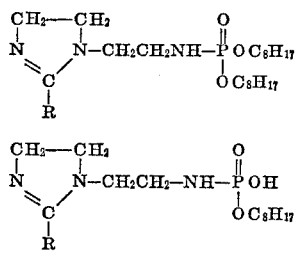

R is $C_{17}$ (derived from Crofatol P).

EXAMPLE 3

This example follows the procedure of Example 2 except that 2-ethyl hexanol is replaced by Alfol 810 (144 g.; 1 mole). Alfol 810 is a commercial mixture of $C_8$ to $C_{10}$, 1-alkanol of average molecular weight 144. The product is likewise a mixture of phosphoramides.

EXAMPLE 4

To a stirred suspension of phosphorus pentasulfide (72.5 g.; 0.33 mole) in toluene (130 ml.) was added the amino-ethyl imidazoline of Example 1 (61 g.; 0.16 mole) dissolved in toluene (45 ml.) during 1¼ hours. The mixture was heated at 100–110° for 1½ hours and then allowed to cool to 50°. Ethanol (37.5 g.; 0.82 mole) was added dropwise during 1½ hours at 50–60° and then heated at 105–110° for two hours to complete the reaction. The product is mainly a mixture of sulfur containing phosphoramides which can be represented by the formulae:

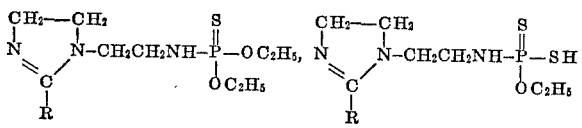

EXAMPLE 5

This example is similar to Example 4 except that ethanol is replaced by an equimolar amount of 2-ethyl hexanol. The product is similarly mainly a mixture of sulfur containing phosphoramides of the following formulae:

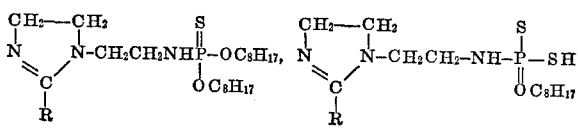

EXAMPLE 6

To a stirred suspension of phosphorus pentoxide (52 g.; 0.4 mole) in toluene (130 ml.) was added the aminoethyl imidazoline of Example 1 (75 g.; 0.2 mole) during 30 minutes. The mixture was then heated at 105–110° for 1¼ hours. After cooling to 40° Alfol 810 oxyethylated with two weights of ethylene oxide (430 g.; 1 mole) was added dropwise at 40–55° in one hour. The reaction was completed by heating at 110–120° for three hours. The product comprised mainly of a mixture of phosphoramides of the following formulae:

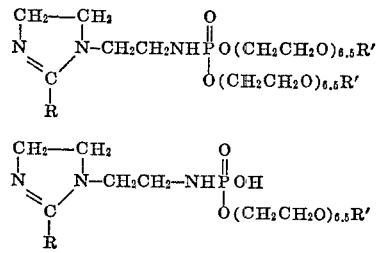

R′=Alfol 810 ($C_8$–$C_{10}$).

EXAMPLE 7

To a stirred suspension of phosphorus pentoxide (26 g.; 0.2 mole) in toluene (130 ml.) was added the amino ethyl imidazoline of Example 1 (37.5 g.; 0.1 mole) dissolved in toluene (45 ml.) during 15 minutes. The mixture was heated under reflux (110°) for one hour and allowed to cool to 35°. To this was added 1-(2 hydroxyethyl) 2-imidazoline (from Crofatol P and hydroxyethyl ethylene diamine) (189 g.; 0.5 mole) dissolved in toluene (50 ml.) during 20 minutes. The reaction was completed by heating at 115–120° for two hours. The product consists mainly of a mixture of phosphoramides of the following formulae:

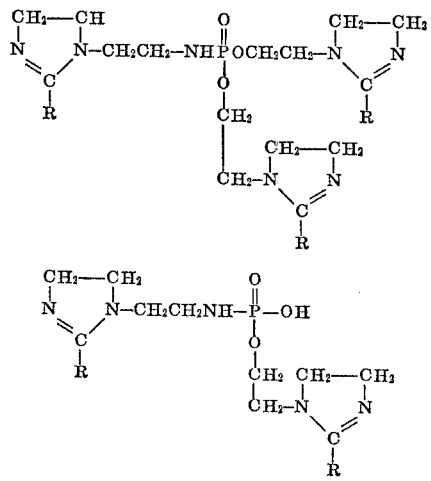

R is $C_{17}$ derived from Crofatol P.

EXAMPLE 8

Crofatol P (590 g.; 2 mole) was mixed with Tretamine #2 (460 g.; 2 equivalents) and heated to 170° for one hour in a reaction flask fitted with still head and condenser for distillation. (Tretamine #2 is a commercial polyamine mixture containing diethylene triamine, triethylene tetramine, tetraethylene pentamine and pentaethylene hexamine as major components).

This time a vacuum of 50 mm. was applied and heating continued at 170–180° for five hours during which time water was distilled from reaction vessel. At this time the reaction was virtually complete as determined by infrared measurement and the product is mainly a mixture of imidazolines of the following formula containing some amide.

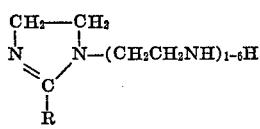

EXAMPLE 9

To a stirred suspension of phosphorus pentoxide (52 g.; 0.4 mole) in toluene (130 ml.) was added the aminoalkyl imidazoline of Example 8 (195.6 g.; 0.2 mole) in toluene (45 ml.) during 25 minutes. The mixture was heated under reflux for one hour and cooled to 30° before adding ethanol (46 g.; 1 mole) dropwise in 20 minutes. The mixture was then heated at 105–110° for 2¼ hours to complete the reaction. The product is mainly a mixture of phosphoramides which can be represented by the formulae:

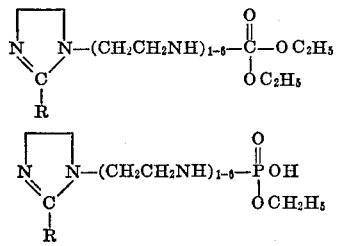

EXAMPLE 10

This preparation follows the method of Example 9 except that the ethanol is replaced by an equivalent amount of 2-ethyl hexanol. The product therefore, consists mainly of the phosphoramides shown in the formulae of Example 9 except that the ethyl group is now 2-ethyl hexyl for this example.

EXAMPLE 11

To the imidazoline of Example 8 (97.8; 0.1 mole) dissolved in kerosene (140 ml.) was added diethyl phosphorochloridate (17.4 g.; 0.1 mole) dropwise in 15 minutes. The mixture was then heated at 75–85° for 2½ hours to bring the reaction to completion. The product of this reaction is mainly a phosphoramide of the following formula:

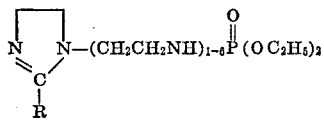

EXAMPLE 12

To the imidazoline of Example 8 (97.8 g.; 0.1 mole) dissolved in kerosene (140 ml.) was added bis(2-ethylhexyl) phosphorochloridate (34.1 g.; 0.1 mole) in 20 minutes. After heating for two hours at 80° the reaction was complete. The product is mainly the phosphoramide of the following formula:

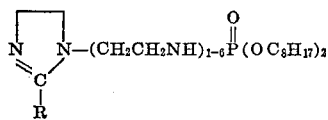

EXAMPLE 13

A mixture of ethylene diamine (120 g.; 2 moles) and Crofatol P (590 g.; 2 moles) was heated together at 110–150° for two hours in a flask fitted with still head and condenser for distillation. At this time a vacuum at 40 mm. was applied and the heating continued at 170–190° for four hours. During this time 75 ml. of water collected (4 moles). The product was shown by infrared spectrum to be mainly the imidazoline of the following formula:

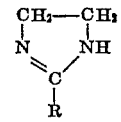

R is Crofatol P residue.

Reactions with the production of Example 13 are summarized as follows:

| No. | Imidazoline | Reactants | Method followed |
|---|---|---|---|
| 14 | Example 13 | Phosphorus pentoxide plus 2-ethyl hexanol. | Example 2. |
| 15 | do | Phosphorus pentoxide plus Alfol 810. | Example 3. |
| 16 | do | Diethyl phosphorochloridate. | Example 11. |
| | | $(C_2H_5)_2\overset{O}{\overset{\|}{P}}Cl$ | |
| 17 | do | Phosphorus pentasulfide plus Alfol 810. | Example 4. |

The above products are analogous to those formed with cyclic amidines having amino side chains except that the amide group is tied directly to a ring nitrogen that is:

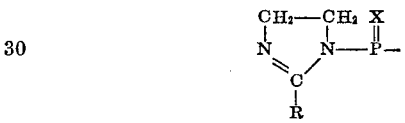

where X=oxygen or sulfur.

USE AS CORROSION INHIBITOR

More specifically, this phase of the invention relates to the inhibition of corrosion in the petroleum industry with specific reference to producing wells, pipe lines, refineries, tank storage, etc.

The use of a corrosion inhibiting agent in the oil industry and other industries, and particularly for the protection of ferrous metals, is well known. For example, see U.S. Pats. Nos. 2,736,658, dated Feb. 28, 1954, to Pfohl et al., and 2,756,211, dated July 24, 1956, to Jones, and 2,727,003, dated Dec. 13, 1955, to Hughes.

More specifically then, and particularly from the standpoint of oil production, this aspect of the invention relates to inhibiting corrosion caused by hydrogen sulfide, carbon dioxide, inorganic acids, organic acids, combinations of each with oxygen, and with each other and oxygen. More particularly, it releates to treating wells to mitigate metal corrosion and associated difficulties.

It should also be pointed out that the corrosiveness of oil well brines will vary from well to well, and the proportion of corrosion inhibiting agent added to the well fluids should also be varied from well to well. Thus, in some wells it may be possible to effectively control corrosin by the addition of as little as 5 p.p.m. of my new compositions to the well fluids, whereas in other wells, it may be necessary to add 200 p.p.m. or more.

In using my improved compositions for protecting oil well tubing, casing and other equipment which comes in contact with the corrosive oil-brine production, I find that excellent results may be obtained by injecting an appropriate quantity of a selected composition into a producing well so that it may mingle with the oil-brine mixture and come into contact with the casing, tubing, pumps and other producing equipment. I may, for example, introduce the inhibiting composition into the top of the casing, thus causing it to flow down into the well and thence back through the tubing, etc. In general, I have found that this procedure suffices to inhibit corrosion throughout the entire system of production, and collection, even including field tankage.

In case serious emulsion or gel problems are encountered, demulsifiers may be added. This is important not only to avoid the troublesome emulsions and gels themselves, but also to improve corrosion inhibition. The explanation of less effective corrosion inhibition in the presence of emulsions apparently is that the inhibitor is somewhat surface-active. That is, it is concentrated at interfacial surfaces. Since this surface is great in an emulsion, most of the inhibitor will be concentrated in these interfaces and little will remain in the body of the oil for deposition on the metal surfaces. In many wells, oil-in-water type emulsions often occur naturally. In such wells the inhibitiors, herein described tending to form water-in-oil type emulsions, often decrease the emulsion problems naturally present. Thus, in addition to being effective corrosion inhibitors, the herein described products tend to eliminate emulsion problems which sometimes appear when some of the present day inhibitors are used in oil wells or refinery processing.

The method of carrying out my process is relatively simple in principle. The corrosion preventive reagent is dissolved in the liquid corrosive medium in small amounts and is thus kept in contact with the metal surface to be protected. Alternatively, the corrosion inhibitor may be applied first to the metal surface, either as is, or as a solution in some carrier liquid or paste. Continuouus application, as in the corrosive solution, is the preferred method however.

The present process finds particular utility in the protection of metal equipment of oil and gas wells, especially those containing or producing an acidic constituent such as $H_2S$, $CO_2$, organic acids, $O_2$ and the like. For the protection of such wells, the reagent, either undiluted or dissolved in a suitable solvent, is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all well-head fittings, connections and flow lines handling the corrosive fluid.

Where the inhibitor composition is a liquid, it is conventionally fed into the well annulus by means of a motor driven chemical injector pump, or it may be pumped periodically (e.g., once every day or two) into the annulus by means of a so-called "boll weevil" device or similar arrangement. Where the inhibitor is a solid, it may be dropped into the well as a solid lump or stick, it may be blown in as a powder with gas, or it may be washed in with a small stream of the well fluids or other liquid. Where there is gas pressure on the casing, it is necessary, of course, to employ any of these treating methods through a pressure equalizing chamber equipped to allow introduction of reagent into the chamber equalization of pressure between chamber and casing, and travel of reagent from chamber to well casing.

Occasionally, oil and gas wells are completed in such manner that there is no opening between the annulus and the bottom of the tubing or pump. This results, for example, when the tubing is surrounded at some point by a packing held by the casing or earth formation below the casing. In such wells the reagent may be introduced into the tubing through a pressure equalizing vessel after stopping the flow of fluids. After being so treated, the well should be left closed in for a period of time sufficient to permit the reagent to drop to the bottom of the well.

For injection into the well annulus, the corrosion inhibitor is usually employed as a solution in a suitable solvent, such as mineral oil, methylethyl ketone, xylene, kerosene, or even water. The selection of solvent will depend much upon the exact reagent being used and its solubility characteristics. It is also generally desirable to employ a solvent which will yield a solution of low freezing point, so as to obviate the necessity of heating the solution and injection equipment during winter use.

For treating wells with packed-off tubing, the use of solid "sticks" or plugs of inhibitor is especially convenient. These may be prepared by blending the inhibitor with a mineral wax, asphalt or resin in a proportion sufficient to give a moderately hard and high-melting solid which can be handled and fed into the well conveniently.

The amount of corrosion preventive agent required in our process varies with the corrosiveness of the system, but where a continuous or semi-continuous treating procedure is carried out as described above, the addition of reagent in the proportion of from 5 parts per million to 1000 parts per million or more parts of corrosive fluid will generally provide protection.

As pointed out previously, the addition of corrosion inhibitors, particularly in the form of a solution by means of a metering pump or the like, is common practice. The particular corrosion inhibitors herein described are applied in the same manner as other corrosion inhibitors intended for use for the same purpose. For sake of brevity, one may use the corrosion inhibitor in solution form by dissolving it in a suitable solvent such as mineral oil, methyl ethyl ketone, xylene, kerosene, high boiling aromatic solvent, or even water.

The following examples are presented to illustrate the superiority of the instant compounds as corrosion inhibitors.

CORROSION TESTS

The test procedure includes measurement of the corrosive action of the fluids inhibited by the compositions herein described upon sand-blasted SAE–1020 steel coupons under conditions approximating those found in an actual producing well, and the comparison thereof with results obtained by subjecting identical test coupons to the corrosive action of the identical fluids containing no inhibitor.

In the present tests clean pint bottles are charged with 300 ml. of a synthetic brine, which contains 42 g. of sodium chloride, 14 g. calcium chloride, 1 g. of sodium sulfate and 17 g. of magnesium chloride per liter, and 140 ml. of kerosene both saturated with hydrogen-sulfide and a predetermined amount of inhibitor is then added. In all cases the inhibitor concentration is based on the total volume of fluid. Bottle caps holding three coupons are then placed tightly on the bottles. The bottles are then placed on a wheel contained in an oven and rotated for 4 hours at 90–95° F. Corrosion rates are then measured using the three coupons in each bottle as electrodes in conjunction with an instrument for measurement of instantaneous corrosion rates. Percent protection is calculated from $$\frac{R_1 - R_2}{R_1} \times 100\%$$

where $R_1$ is corrosion rate of uninhibited fluids
$R_2$ is corrosion rate of inhibited fluids Film life is then determined by replacing fluids in each bottle with 300 ml. brine and 140 ml. kerosene saturated with hydrogen sulfide as before but no inhibitor. Heating and rotation is continued in the oven at 90–95° F. and corrosion rates measured at various times. The inhibitor film on the coupons gradually is lost in this stage of the test and is followed by an increase in corrosion rate. Once the protection falls below 85% the film is considered unsatisfactory and this marks the end of film life. It can be appreciated that the longer the film life the more useful the inhibitor. The compositions of this invention give excellent protection in presence of inhibitor and particularly give long film life when subjected to the above test.

The data contained in the following table clearly demonstrate the superior quality of the phosphoramidates of the cyclic amidines compared with the related unphosphorylated cyclic amidines.

TABLE 5

| Composition of Example No. | Concentration, p.p.m. | Percent protection | Film life, hrs. | Comments |
|---|---|---|---|---|
| 1 | 100 | 99 | 1-4 | Unphosphorylated amidine. |
| 2 | 50 | 100 | 5 | Phosphorylated derivative. |
| 3 | 75 | 100 | 17 | Do. |
| 6 | 150 | 100 | 65 | Do. |
| 10 | 100 | 100 | >17 | Do. |
| 12 | 50 | 100 | 4 | Do. |
| 13 | 100 | 99 | <4 | Unphosphorylated amidine. |
| 14 | 100 | 100 | >17 | Phosphorylated derivative. |
| 15 | 100 | 100 | 17 | Do. |

OTHER USES

The products are effective not only as corrosion inhibitors but can be used for a number of other purposes. For instance, they can be used as asphalt additives to increase the adhesiveness of the asphalt to the mineral aggregates. In the form of water soluble salts, they are useful as bactericides in the secondary recovery of oil.

In addition, the compounds of this invention have the following uses:

Agriculture: kerosene, phenothiazine, pyrethrum sprays, fungicides, herbicidal oils.

Anti-static treatment: for hotel rugs, hospital floors, automobile upholstery, plastic and wax polishes, wool oils, lubricants for synthetic fibers.

Building materials: water repellant treatment for plaster, concrete, cement, roofing materials, air entrainment, floor sealers, linoleum.

Cosmetics: formulation of anti-perspirants, deodorants, sun screens, hair preparations.

De-emulsifying: in antibiotic extraction, breaking crude oil- and water-gas for emulsions.

Detergents: metal cleaning emulsions, lens cleaners, floor oils, dry cleaning detergents, radiator flushes, cesspool acid, boiler scale solvents, germicidal corrosion-inhibited acid detergents for dairies, enamel equipment, toilet bowls.

Leather: Fat liquoring oils, pickling, acid degreasing dye fixative.

Metals: rust preventive oils, cutting oils, water displacing compounds, pickling inhibitor, solvent degreasing.

Paints: for improved adhesion of primers, preventing water spotting in lacquers, antiskinning, pigment flushing, grinding and dispersing, anti-feathering in inks.

Petroleum: germicide in flood water treatment, de-emulsifying fuel oil additives, anti-strip agent in asphalt emulsion and cutbacks.

Textiles: in rubberizing, textile oils, dyeing assistants, softening agents.

Miscellaneous: bentonite-amine complexes, metal-amine complexes, preparation of pentachlorphenates, quaternaries, plastisols, and rodent repellents.

Having thus described my invention what I claim as new and desire to obtain by Letters Patent is:

1. A process of inhibiting corrosion of ferrous metals and alloys in producing wells, pipe lines, refineries, storage tanks and equipment related thereto comprising treating said metals and alloys with cyclic amidine-containing amides, or mixtures thereof, of the formula $$\begin{array}{c} \text{N} \diagup^{\!\!\!\!-B-}\!\!\diagdown \text{N}-(\text{ANH})_p-\overset{\overset{X}{\|}}{P}\diagup^{XR'}_{XR'} \\ \diagdown_C\diagup \\ | \\ R \end{array}$$

wherein

X is a member selected from the group consisting of O and S,

B is a member selected from the group consisting of
$-CH_2-CH_2-$, $-CH_2-CH_2-CH_2-$, $-CH_2-CH- \atop |\phantom{CH_2-}CH_3$ $-CH_2-CH-CH_2- \atop \phantom{-CH_2-}|\phantom{-CH_2-}CH_3$, and $-CH-CH- \atop |\phantom{CH-}|\phantom{CH-}CH_3\phantom{-}CH_3$ p is 1-10, A is a member selected from the group consisting of
$-CH_2-CH_2-$ and $-CH_2-CH_2-CH_2-$ R is (1) hydrogen, (2) saturated aliphatic hydrocarbon of 1 to 31 carbon atoms, (3) unsaturated aliphatic hydrocarbon, without any acetylenic unsaturation, of 2 to 31 carbon atoms, (4) cycloaliphatic hydrocarbon of 6 to 31 carbon atoms, (5) phenyl heptadecyl, (6) o-hydroxyphenyl, (7) 2-hydroxy-3-methyl phenyl, (8) p-tert-butyl phenyl, (9) p-hydroxyphenyl, (10) the non-acid moiety of hydroxy naphthenic acid, (11) phenyl- (12) 2-hydroxy-3-methoxyphenyl, or (13) mixtures thereof, and R' is (1) hydrogen, (2) alkyl of 1 to 12 carbon atoms, (3) cyclopentyl, (4) cyclohexyl, (5) phenyl, (6) tolyl, (7) anisyl, (8) furfuryl, (9) $(CH_2CH_2O)_{6.5}R^x$, $R^x$ being a mixture of hydrocarbon radicals from a mixture of $C_8$ to $C_{10}$, 1-alkanol of average molecular weight of 144.

2. The process of claim 1 wherein at least one X is oxygen.

3. The process of claim 1 wherein at least one X is oxygen and another X is sulfur.

4. The process of claim 1 wherein X is oxygen.

5. The process of claim 4 wherein said metals and alloys are treated with a mixture of said amides of the formulae $$\begin{array}{c} CH_2\!-\!\!-\!CH_2 \\ | \phantom{CH_2\!-\!}| \\ N \phantom{\diagup} N-CH_2CH_2NH-\overset{\overset{O}{\|}}{P}\!-\!OC_8H_{17} \\ \diagdown_C\diagup \phantom{XXXXX} | \\ | \phantom{XXXXXXXXX} OC_8H_{17} \\ R \end{array}$$

and $$\begin{array}{c} CH_2\!-\!\!-\!CH_2 \\ | \phantom{CH_2\!-\!}| \\ N \phantom{\diagup} N-CH_2CH_2NH-\overset{\overset{O}{\|}}{P}\!-\!OH \\ \diagdown_C\diagup \phantom{XXXXX} | \\ | \phantom{XXXXXXXXX} OC_8H_{17} \\ R \end{array}$$

References Cited

UNITED STATES PATENTS

| | | | |
|---|---|---|---|
| 3,116,249 | 12/1963 | Ratner et al. | 260—309.6 X |
| 2,468,163 | 1/1948 | Blair et al. | 252—8.55 |
| 2,891,909 | 6/1959 | Hughes | 252—8.55 |
| 3,014,864 | 12/1961 | Hughes et al. | 252—8.55 |
| 3,584,008 | 6/1971 | Redmore | 260—309.6 |

HERBERT B. GUYNN, Primary Examiner

U.S. Cl. X.R.

8—94.1 P; 21—2.5, 2.7; 106—2, 14, 20, 279; 117—139.5 CQ; 252—49.9, 344, 389, 542; 260—251 P, 256.4 H, 309.6; 424—200